Figure 1:
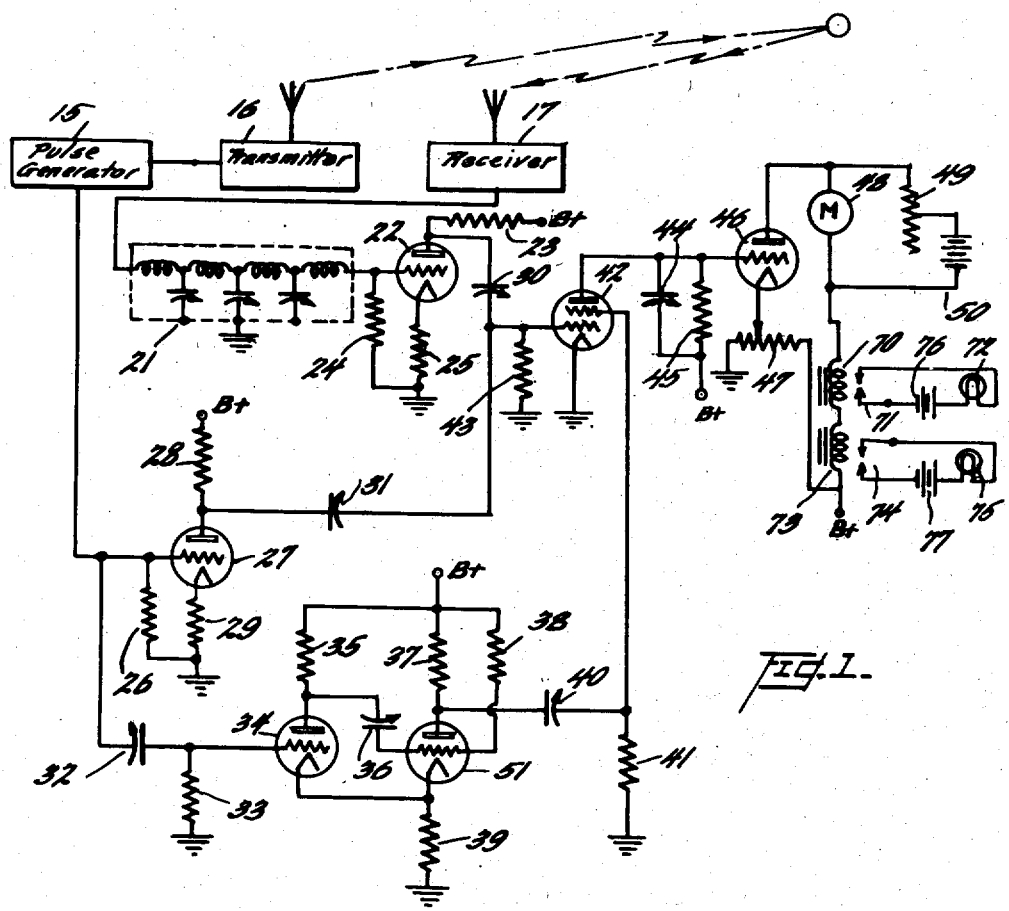

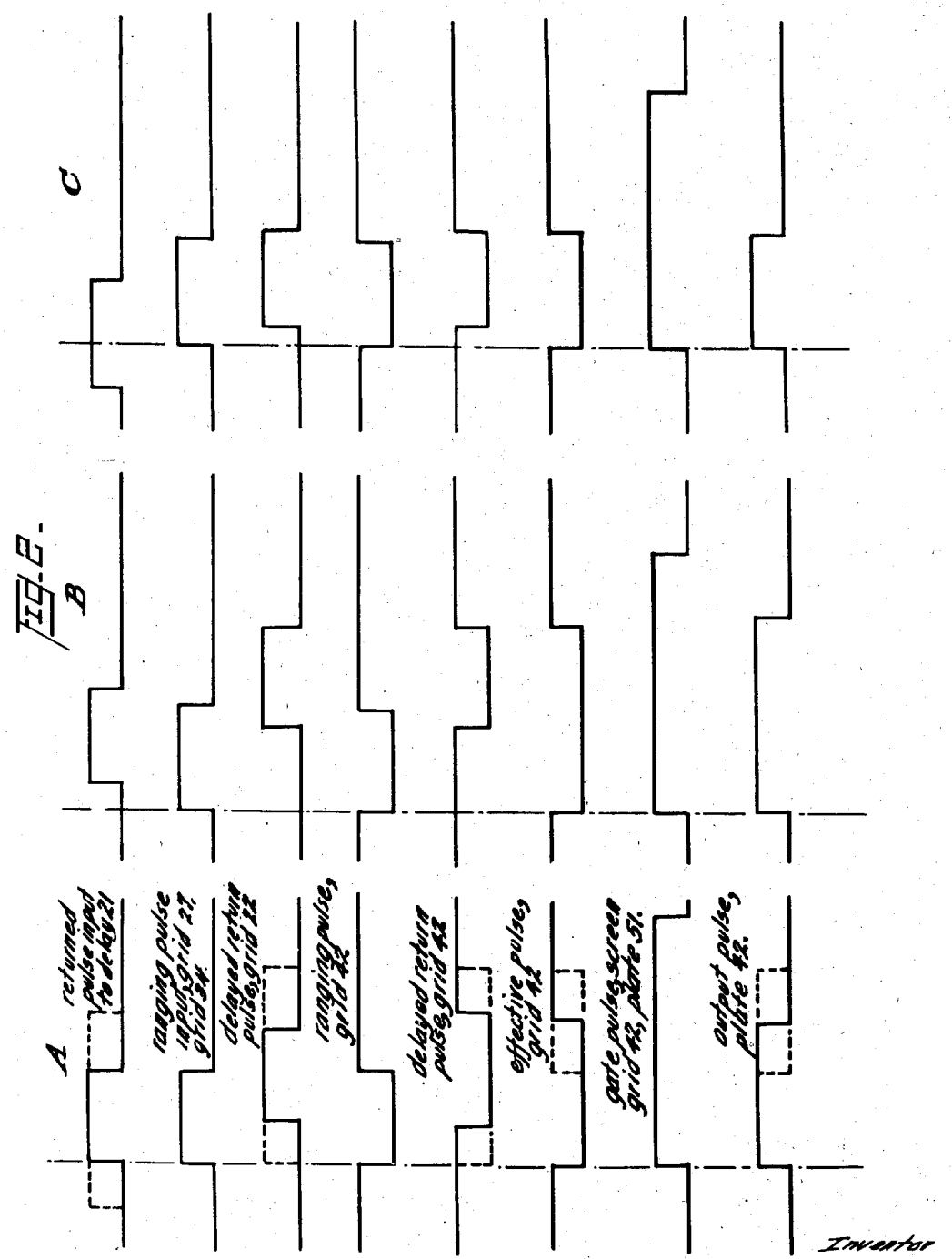

Patented July 10, 1951

2,560,289

UNITED STATES PATENT OFFICE 2,560,289

PULSED DISTANCE MEASURING
INSTRUMENT

Arthur F. Hasbrook, San Antonio, Tex., assignor to Olive S. Petty, San Antonio, Tex.

Application December 31, 1948, Serial No. 68,593

5 Claims. (Cl. 343—13)

This invention relates to systems for indicating the position of moving craft by measurement of variation in time of transmission of electronic signal pulses between the craft and a fixed station, and to apparatus for measuring the time interval or phase difference between electrical pulses for use in such systems.

In distance measuring systems of the electronic pulse type, it is common practice to transmit a signal comprising recurring radio pulses from a master station toward a reflecting object, or to a slave station at which the pulsed signal is received and reradiated, to receive the reflected or reradiated signal at the master station, and to determine the distance to the object or slave station by measurement of elapsed time or phase difference between the transmitted and reflected or reradiated signals. Conventional systems of this character do not, however, effect distance measurement with high accuracy, particularly when the distance through which the signal is transmitted is considerable. Furthermore, many measuring systems designed to give an indication of departure from a prescribed course, sometimes called on-course indicators, do not show the sense or direction of departure from the course. It is therefore an object of the invention to provide apparatus for indicating with a high degree of accuracy the position of a moving vessel or other craft, such apparatus showing further the sense or direction of deviation from a prescribed course when employed in an on-course system.

More specifically, it is an object of the invention to provide an indicating system especially adapted to facilitate the steering of a craft along a course which is always equidistant from a fixed course or from a fixed position or station, in which the extent and direction of deviation from the prescribed course is directly and accurately indicated. In the preferred form of the invention, the desired result is achieved by transmitting a pulsed signal over a path of which the distance is to be measured, returning the signal to the transmitting station, either by reflection or reradiation, and so combining the returned signal with a pulsed signal of the same repetition rate, called a ranging or reference pulse, as to produce composite pulses of a length which varies inversely with the duration of the period of overlapping of the pulses thus combined. By proper timing of the returned and ranging pulses, combination thereof may be so effected that the pulses will either coincide or will invariably overlap in the same sequence, so that the duration of the period of pulse overlapping will indicate the sense or direction of displacement of moving craft from a predetermined course.

A further object of the invention is the provision of pulse measuring apparatus in which pulse displacement may be indicated on a meter, the indication being unaffected by variation in amplitude of the signal pulses.

Figure 3:
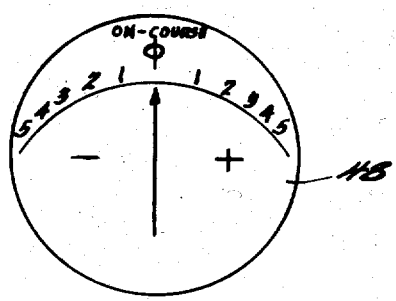

Further objects and features of the invention will be apparent from the following description taken in connection with the accompanying drawings, in which Figure 1 is a wiring diagram of pulse measuring apparatus suitable for use in the practice of the invention;

Figure 2 shows a series of pulsed signals representing the signal energy at various points in the apparatus shown in Figure 1, each of the several series A, B, and C representing a different transmission distance, and Figure 3 represents the indicating face of a meter suitable for use in the circuit shown in Figure 1.

In order to facilitate an understanding of the invention, reference is made herein to a specific embodiment thereof as illustrated in the accompanying drawings, and specific language is employed to described the same. It will nevertheless be understood that no limitation of the invention is thereby intended, such modification and alteration of the illustrated apparatus being contemplated as would normally occur to those conversant with the field of the invention.

As hereinbefore indicated, the invention is applicable to conventional system of distance measurement, one such system being illustrated in a simple and schematic manner. Thus the system may comprise a pulse generator 15 from which pulsed signal energy is supplied to a transmitter 16 at a master station, the signal being returned to receiver 17 after reflection from a distant object or surface or after reradiation from a slave station. The signal energy derived from the receiver, described as the returned pulse input, is delayed in transit to an extent determined largely by the length of the transmission path, and the amount of the delay is determined by comparing the returned pulse input with a ranging pulse input which may be derived from pulse generator 15 and which has the same repetition rate as the transmitted pulse. The details of this system form no part of the instant invention, although as hereinbefore suggested the invention is especially useful to a system in which the master station is located aboard a moving vessel. When employed on a surface vessel, the signal energy is reflected or reradiated from a fixed point, and the vessel may be steered so as to maintain a constant distance from that point, the course being substantially circular. When employed on aircraft, the same method may be followed, or alternatively the ground may be used as a reflecting medium, and the system employed to maintain the craft at a constant elevation. These and other uses of the invention will be readily appreciated by those skilled in the art.

Turning now to the measuring circuit shown in Fig. 1, it will be observed that in this circuit the returned pulse input and the ranging pulse input are combined to yield an output pulse of variable width or duration which is then utilized to produce a nonambiguous course indication, following the practice of the invention. Thus the ranging pulse, which is fixed in time for any chosen distance, is impressed on the grid of vacuum tube 27, which has associated with it grid resistor 26, cathode bias resistor 29 and plate load resistor 28. The ranging pulse input to grid of tube 27 applies a voltage pulse across plate load resistor 28, which pulse is then fed through capacitor 31 to the succeeding circuits.

The ranging pulse input is also coupled through capacitor 32, across grid resistor 33, to trigger the gate multivibrator circuit consisting of tubes 34 and 51. In the quiescent state, tube 51, which has slightly positive grid potential due to the grid return through resistor 38 to plate supply, draws considerable plate current which effects a voltage drop across cathode resistor 39. This bias voltage is applied to the cathode of tube 34 so as to cut off its plate current. Upon being triggered by a positive pulse, tube 34 conducts plate current which sets up multivibrator action via capacitor 36 and grid resistor 38. A positive pulse, of large amplitude and of duration determined primarily by the values of capacitor 36 and resistor 38, is thereby produced at the plate of tube 51. This positive pulse is fed through capacitor 40 to succeeding circuits.

The returned pulse input, which is variable in arrival time depending upon the distance to the remote or slave station, is impressed on a delay circuit 21, which is preferably adjustable to vary the extent of delay, and thence on the grid of tube 22, which has associated with it grid resistor 24, cathode bias resistor 25 and plate load resistor 23. The returned pulse input to grid of tube 22 applies a voltage pulse across plate load resistor 23, which pulse is then fed through capacitor 38 to the succeeding circuits.

Tube 42 is a multigrid tube, and control grid fluctuations do not produce plate current changes unless the screen grid of the tube is maintained at the proper potential. Normally this potential is below the operating potential, and tube 42 is nonconducting. However, when the ranging pulse input triggers the multivibrator gate tubes 34 and 51, the resulting gate pulse at the plate of tube 51 is coupled through capacitor 40 across resistor 41 so as to raise the screen voltage of tube 42 to high positive potential for the duration of the gate pulse. During this period, tube 42 responds to pulse signals on its control grid, but does not respond to such signals until gated on. The ranging pulse input signal passes through tube 27 and capacitor 31 to affect tube 42 when the latter is gated on. It is to be noted that the ranging pulse always is effective on tube 42, since the gating circuit is triggered by the same ranging pulse input. Similarly, the returned pulse input is effective on tube 42, provided the tube is gated on at the time the returned pulse signal is applied.

Thus the plate circuit of tube 42 will contain fluctuations caused by ranging pulse and returned pulse signals as permitted by proper gating. Tube 42 is so operated that varying amplitude of input signals does not affect the signal fluctuations in the plate circuit; that is, the tube is driven completely to cut-off by very small grid signals and larger signals can cause no further change. Voltage pulses on the plate of tube 42 are then variable only in width or duration. Plate current fluctuations pass through plate load resistor 45 which is by-passed by capacitor 44. If capacitor 44 and resistor are chosen to obtain the proper time constant, capacitor 44 is maintained at a potential dependent upon the average current through 45. Varying pulse widths will vary the average plate current, so that the voltage across capacitor 44 will vary with pulse width.

In order to indicate these voltage variations with variations in pulse widths, a vacuum tube voltmeter circuit, consisting of tube 46 and its associated elements, is provided. Resistor 47 is used to apply positive voltage to the cathode of tube 46 and thus cancel out the effect of the high static voltage on the grid. Meter 48 is connected in the plate circuit with associated variable resistor 49 and bias battery 50, which balance out the static plate current which would otherwise flow through the meter. Other types of vacuum tube voltmeters may, of course, be utilized. Meter 48, as shown more particularly in Fig. 5, is arranged with a center zero, so that the deflections may occur either to the left or the right, depending upon the signal input to the tube 46, so as to indicate the direction as well as the extent of deviation from the prescribed course. The use of a meter is, of course, not essential but is highly desirable in the interest of accuracy and to facilitate reading in high ambient light levels.

It is desirable in some instances that the pilot of the craft be given warning indications when the craft deviates excessively from the desired course; it will be appreciated that this deviation could occur should the pilot be so occupied as to not be able to watch the course indicator for a considerable time, and devices are preferably provided to meet this contingency. Thus in series with the high potential supply from tube 46, are two sensitive relays 70 and 73. Relay 70 is so constructed as to be inoperative until considerably more than normal plate current flows through tube 46. When the signal on the grid of tube 46 increases the plate current to a sufficiently high value, relay 70 is energized close to contacts 71 so that current flows through warning lamp 72 and battery 76. Relay 73 is so constructed as to be operative when normal plate current flows through tube 46. When the signal on grid of tube 46 decreases the plate current considerably, relay 73 becomes inoperative and contacts 74 are closed, so that current flows through warning lamp 75 and battery 77. Thus warning lamp 72 is lighted when the craft deviates excessively from the on-course in one direction, and warning lamp 75 lights when deviation from on-course is excessive in the opposite direction. By way of example, lamp 72 may operate when the meter deflection exceeds +5; and lamp 75 may operate when the meter deflects beyond −5. It is apparent that, where desired, suitable amplification may be employed between the plate circuit of tube 46 and relays 70 and 73 in order to provide larger current variations and more reliable operation. Also relays 70 and 73 may be arranged to operate audible rather than warning devices.

In Fig. 2 are represented several series of pulses appearing at different points in the circuit to illustrate the operation of the apparatus at different transmission distances, the series A pertaining to a transmission distance such that the returned pulse coincides with a ranging pulse, whereas in the series B the returned pulse follows and in series C precedes a ranging pulse. It will be appreciated, of course, that the returned pulse is compared with a later generated ranging pulse, there being inevitably substantial delay required for the transmission of the signal energy to and from the reflecting point or slave station.

As is shown in series A, in which the returned and ranging pulses are coincident, the returned pulse is delayed to a predetermined extent in the delay circuit 21, and the delayed returned pulse applied to grid 22 thus overlaps with the ranging pulse input at the grids of tubes 27 and 34, but is slightly later in time of arrival. The ranging pulse and the delayed returned pulse as applied to the grid of tube 42 are merely inverted, and are there combined to form the effective pulse, which has a length greater than the ranging pulse by an amount determined by the extent of overlap of the ranging pulse and the delayed return pulse. The gate pulse as applied to the screen grid of tube 42 may, as shown in the drawing, be initiated concurrently with the ranging pulse, and has a length which is at least as great as the sum of the returned and ranging pulses and is preferably substantially longer. The output pulse, representing maximum voltage on the plate of tube 42, is the same length as the effective pulse. The extent to which the returned pulse input may vary in point of time is shown in dotted lines in the first curve of the series; the corresponding permissible variation in other curves of the series is likewise shown in dotted lines. It will be appreciated that if the transmission distance becomes so short that the delayed returned pulse begins before the ranging pulse, the output pulse will have the same length as if the delayed returned pulse and the ranging pulse were coincident, since tube 42 is inoperative prior to the application of the gate pulse to the screen grid thereof. Thus upon excessive deviation of the craft from the prescribed course, the meter reading remains at a maximum, and misleading indications are thereby avoided. Similarly, if the delayed returned pulse should not commence until after the ranging pulse is terminated, the output pulse will not be increased in length beyond that length which would be produced if the delayed returned pulse began precisely on termination of the ranging pulse. Since the gate pulse is considerably longer than the sum of the returned and ranging pulses, the meter reading will remain at a maximum although deviation from the reflecting point or slave station considerably exceeds that contemplated.

Obviously proper indications can be made, if desired, by a timing in which the delayed returned pulse invariably precedes rather than follows the ranging pulse, provided the gate pulse is adjusted to terminate concurrently with the ranging pulse rather than to begin concurrently therewith. In any event, the circuit 21 or other delaying device is adjusted at the outset to vary the extent of delay in order that the returned pulse will overlap with the ranging pulse and will normally lie within the limits imposed by the dotted lines in the curves of series A. In other words, the optimum phase relationship between the returned pulse and the ranging pulse is initially established by setting the delay device 21.

It will be appreciated that the gate pulse need not be applied to the tube in which the ranging and returned pulses are combined, but may be applied to a tube in a later stage dealing with the combined signals. Alternatively, other methods of rendering the circuit inoperative for the desired period may be employed. While optimum results are ordinarily obtained when this period is longer than the sum of the returned and ranging pulses, useful results are obtained whenever this period is appreciably longer than either the ranging or returned pulses, whichever is longer.

In the series of curves represented at B are shown the various signals as they appear at the specified points in the circuit when the returned pulse is later than the ranging pulse, as hereinbefore indicated. In series C, the returned pulse precedes the ranging pulse, but by virtue of the delay in unit 21, the delayed returned pulse follows the ranging pulse and is therefore effective in the same manner as illustrated in series A and B.

It will be appreciated that the invention contemplates the provision of simple and effective apparatus for measuring pulse displacement, capable of indicating the sense as well as the amount of the displacement, and avoiding misleading indication on the occurrence of excessive displacement. While the apparatus is described principally by reference to its use in an on-course indicating system, in which it exhibits extreme accuracy, it is also highly useful for pulse measurement generally. Adaptation of the apparatus to other types of navigating systems may obviously be readily effected. For instance, it is obvious that by varying suitably with time the characteristics of the elements which constitute delayed circuit 21, the apparatus may readily be used in the steering of a craft on a course which varies in distance from the reflecting point or surface.

Having thus described the invention, what is claimed as new and desired to be secured by Letters Patent is:

1. Apparatus for measuring the time displacement of two pulsed signals including, in combination, a thermionic tube having control and screen grids, means supplying in overlapping time relation to the control grid of said tube a negative reference pulse and a negative pulse to be measured, biasing means applying a bias to said tube such that either of said pulses drives the tube to cut-off, means periodically applying an operating voltage to said screen grid for a period including the whole period of said reference pulse and appreciably longer than either of said pulses, said voltage being initiated concurrently with the leading edge of said reference pulse, devices for measuring the average output of said tube, and connections between said tube and said devices.

2. Apparatus for measuring the time displacement of two pulsed signals including, in combination, a thermionic tube having control and screen grids, means supplying in overlapping time relation to the control grid of said tube a negative reference pulse and a negative pulse to be measured, biasing means applying a bias to said tube such that either of said pulses drives the tube to cut-off, means periodically applying an operating voltage to said screen grid for a period including the whole period of said reference pulse and appreciably longer than either of said pulses, said voltage being withdrawn concurrently with the termination of said reference pulse, devices for measuring the average output of said tube, and connections between said tube and said devices.

3. In a system for determining position by the transmission of a pulsed signal from a master station, the return of the signal to the master station, and the measurement of the transmission distance by reference to the elapsed transmission time, the combination with a generator for pulsed signals, a transmitter energized from said generator for radiating said signals, and a receiver for collecting the returned pulse signal, a thermionic tube having control and screen grids, means supplying negative returned pulses derived from said receiver and negative ranging pulses derived from said generator to the control grid of said tube, said means including a signal delay device through which one series of pulses is passed to effect combination of the returned and ranging pulses in overlapping relation, and devices deriving a series of gating pulses from said generator and applying the same to said screen grid, said gating pulses applying to said screen grid a voltage sufficient to render the tube operative, being longer than the sum of said returned and ranging pulses and beginning concurrently with said ranging pulse, devices for measuring the average output of said tube, and connections between said tube and said devices.

4. In a system for determining position by the transmission of a pulsed signal from a master station, the return of the signal to the master station, and the measurement of the transmission distance by reference to the elapsed transmission time, the combination with a generator for pulsed signals, a transmitter energized from said generator for radiating said signals, and a receiver for collecting the returned pulsed signal, of a thermionic tube having control and screen grids, means supplying negative returned pulses derived from said receiver and negative ranging pulses derived from said generator to the control grid of said tube, said means including a signal delay device through which one series of pulses is passed to effect combination of the returned and ranging pulses in overlapping relation, and devices deriving a series of gating pulses from said generator and applying the same to said screen grid, said gating pulses applying to said screen grid a voltage sufficient to render the tube operative, being longer than the sum of said returned and ranging pulses and ending concurrently with said ranging pulse, devices for measuring the average output of said tube, and connections between said tube and said devices.

5. In a system for determining position by the transmission of a pulsed signal from a master station, the return of the signal to the master station, and the measurement of the transmission distance by reference to the elapsed transmission time, the combination with a generator for pulsed signals, a transmitter energized from said generator for radiating said signals, and a receiver for collecting the returned pulsed signal, of a thermionic tube having control and screen grids, means supplying returned pulses from said receiver to the control grid of said tube, means supplying ranging pulses from said generator to said control grid, means periodically applying an operating voltage to said screen grid for a period including the whole period of a ranging pulse but substantially longer than either of said pulses, devices for measuring the output of said tube, and connections between said tube and said devices.

ARTHUR F. HASBROOK.

REFERENCES CITED

The following references are of record in the file of this patent:

UNITED STATES PATENTS

| Number | Name | Date |
| --- | --- | --- |
| 2,403,527 | Hershberger | July 9, 1946 |
| 2,421,018 | De Rosa | May 27, 1947 |
| 2,482,544 | Jacobsen | Sept. 20, 1949 |
| 2,485,821 | Gloess et al. | Oct. 25, 1949 |